Dec. 28, 1965   H. J. MAGINNISS   3,225,668
METHOD AND APPARATUS FOR DISTRIBUTING CONCRETE
Filed Aug. 30, 1962   7 Sheets-Sheet 2
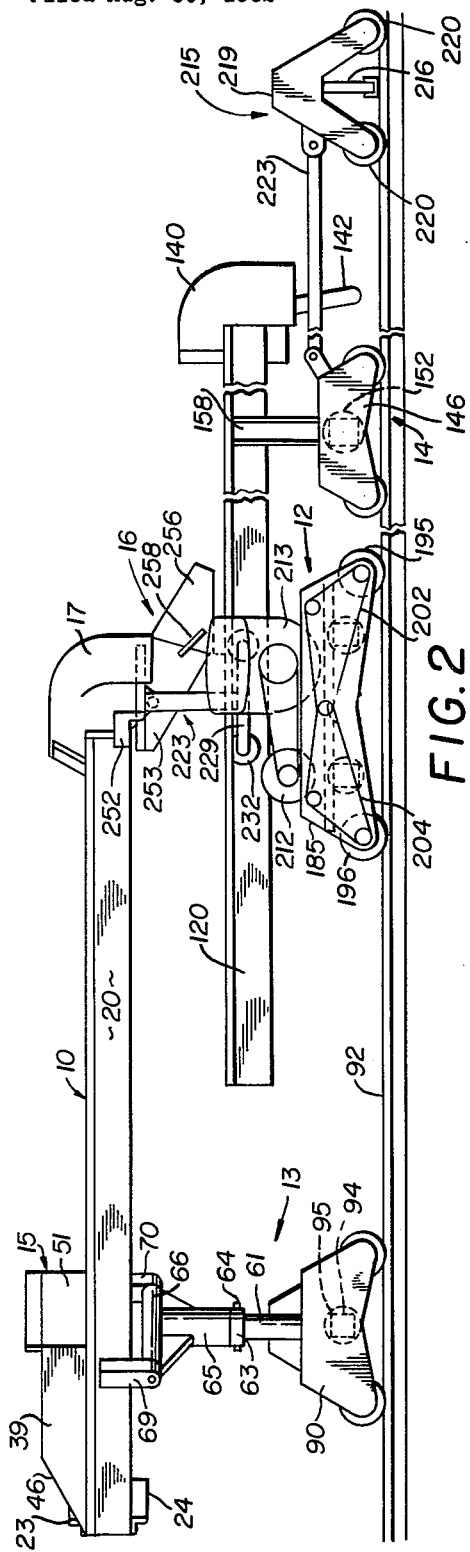
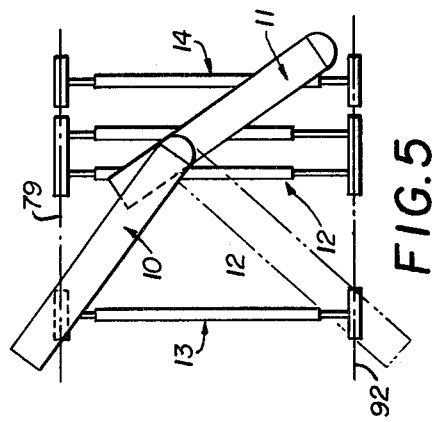
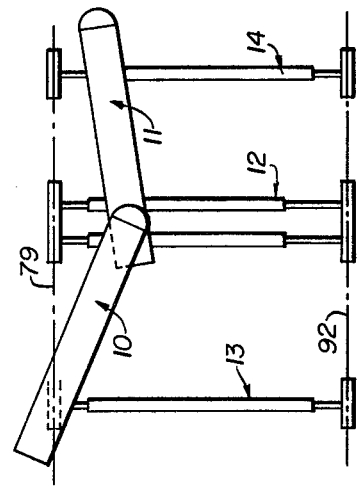
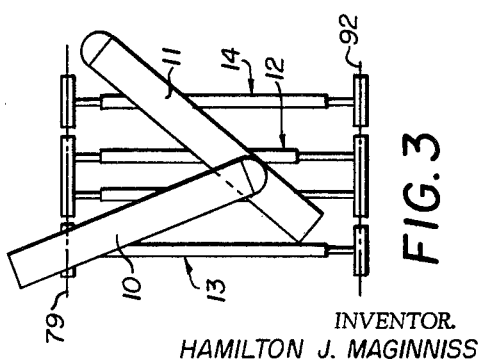
INVENTOR.
HAMILTON J. MAGINNISS
BY
ATTORNEYS Dec. 28, 1965    H. J. MAGINNISS    3,225,668
METHOD AND APPARATUS FOR DISTRIBUTING CONCRETE
Filed Aug. 30, 1962    7 Sheets-Sheet 3
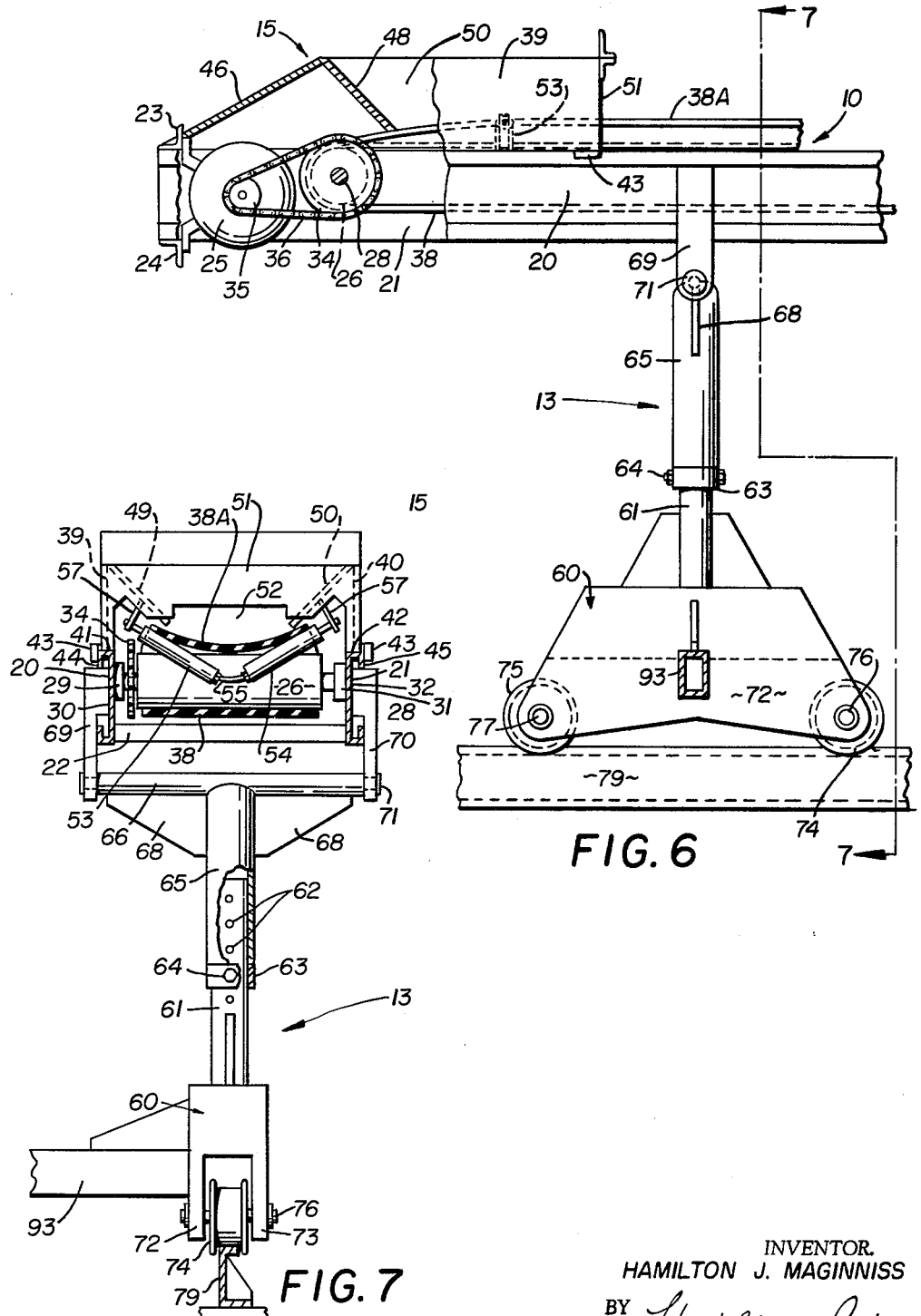
INVENTOR.
HAMILTON J. MAGINNISS
BY Hamilton O Cook
ATTORNEYS Dec. 28, 1965        H. J. MAGINNISS        3,225,668
METHOD AND APPARATUS FOR DISTRIBUTING CONCRETE
Filed Aug. 30, 1962        7 Sheets-Sheet 4

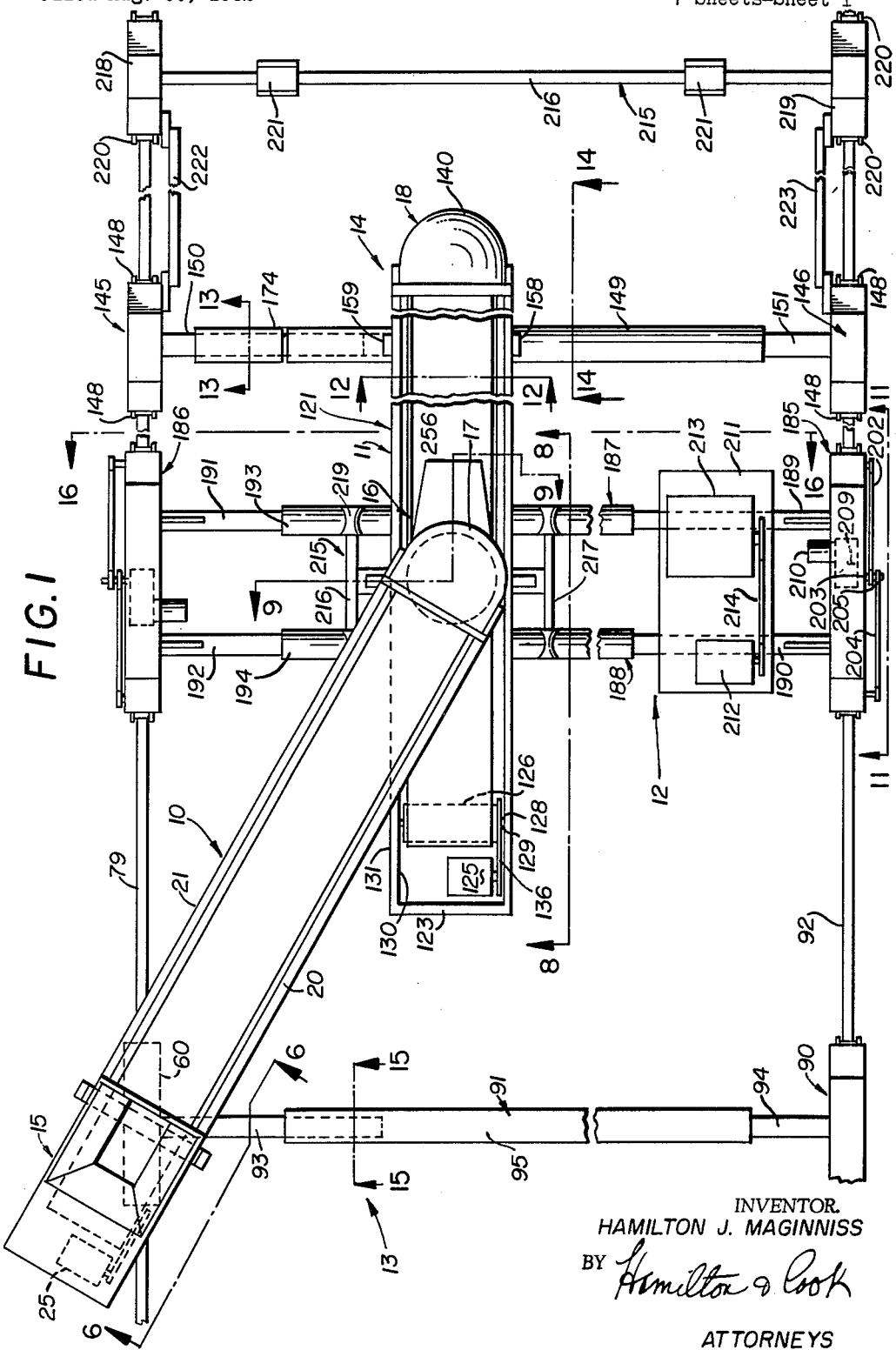

INVENTOR.
HAMILTON J. MAGINNISS
BY
ATTORNEYS

Dec. 28, 1965 H. J. MAGINNISS 3,225,668
METHOD AND APPARATUS FOR DISTRIBUTING CONCRETE
Filed Aug. 30, 1962 7 Sheets-Sheet 5
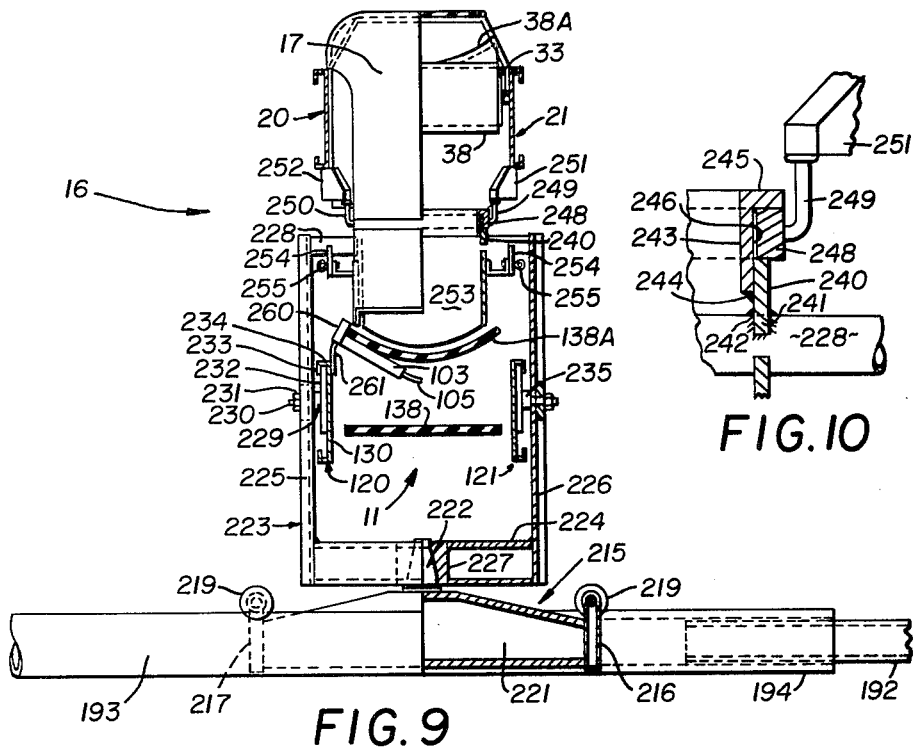
FIG. 10
FIG. 9
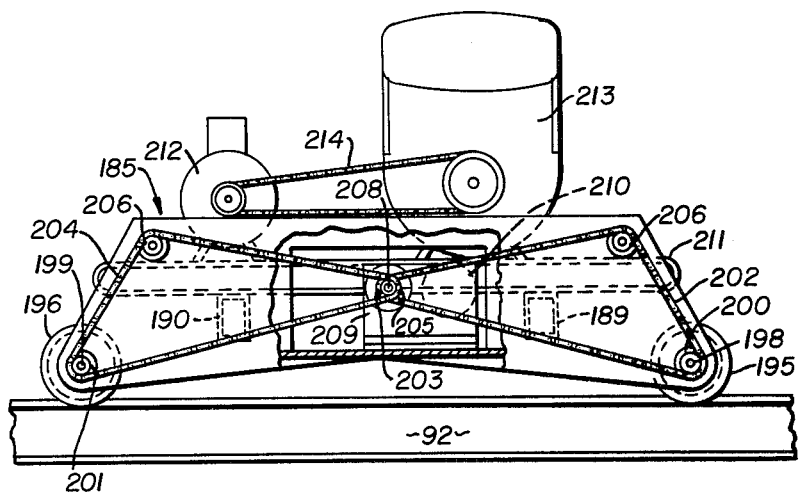
FIG. 11
INVENTOR.
HAMILTON J. MAGINNISS
BY Hamilton & Cook
ATTORNEYS Dec. 28, 1965  H. J. MAGINNISS  3,225,668
METHOD AND APPARATUS FOR DISTRIBUTING CONCRETE
Filed Aug. 30, 1962  7 Sheets-Sheet 6

INVENTOR.
HAMILTON J. MAGINNISS
BY Hamilton D Cook
ATTORNEYS

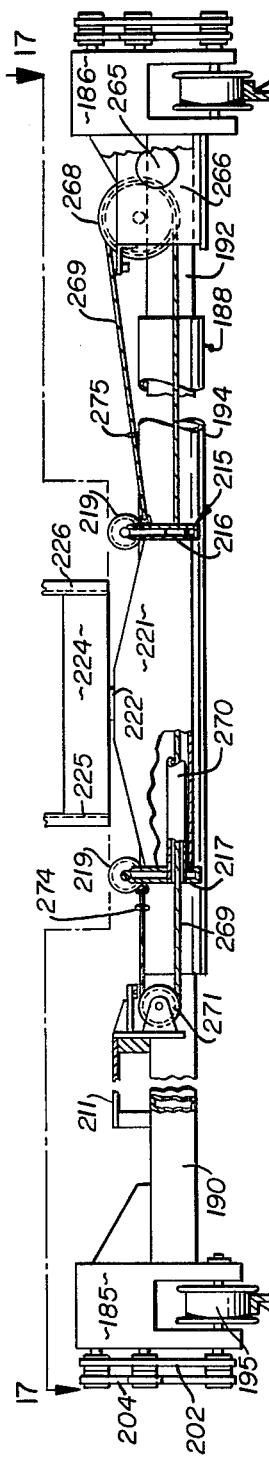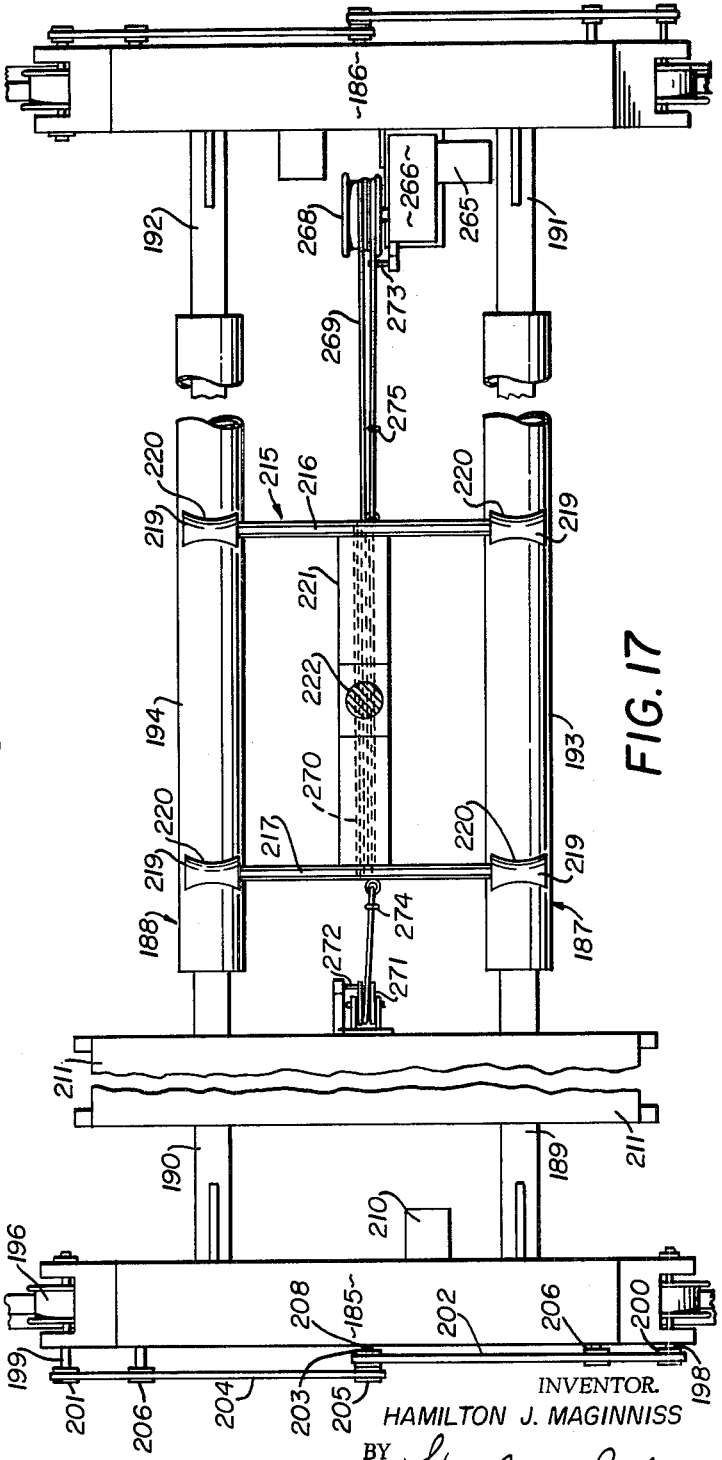

United States Patent Office 3,225,668
Patented Dec. 28, 1965

3,225,668
METHOD AND APPARATUS FOR DISTRIBUTING CONCRETE
Hamilton J. Maginniss, 563 Russell Road, Mansfield, Ohio
Filed Aug. 30, 1962, Ser. No. 220,412
13 Claims. (Cl. 94—46)

The present invention relates to devices for distributing concrete. More particularly, the present invention relates to a device for receiving concrete from a source of supply and depositing it in place on the sub-grade or sub-base. Specifically, the present invention relates to a device for continuously receiving concrete from a supply source and distributing it on the sub-grade or receiving surface in a selective pattern and depth.

Concrete distributors are particularly suitable in the construction of roads and highways, airport runways, floors, bridge decks or any other slab-like concrete structure. In the construction of such structures the concrete is generally brought to the locus by ready-mix, transit-mix, agitator or ordinary dump-body supply trucks. Once at the situs it is necessary to transfer the concrete from the trucks onto the sub-grade or sub-base receiving surface or supporting structure, preparatory to spreading, striking off and finishing.

In the "pick and shovel" days the concrete was dumped in piles onto the receiving surface and spread by shovel to the approximate thickness required. The concrete was then "struck" to the exact thickness and then float finished. Not only was this method extremely laborious but the repeated handling of the concrete caused aggregate separation, thus decreasing the strength of the finished concrete.

Mechanization marked the advent of large, cumbersome machinery to spread concrete as it was dumped at the site.

For example, if the concrete were to be laid in a given thickness between side forms, the supply vehicle would dump its load between the forms in close proximity to the strip already laid and the mechanical spreader would strike off the concrete to the desired height in relation to the top of the forms. One type such spreader utilizes either a moving paddle or horizontal screws to move the piled concrete both laterally between the sides of the form and longitudinally of the form ahead of the spreader. Another type spreader utilizer a moving paddle to roll the excess concrete ahead of the spreader, filling in the low places and striking of the high spots. In this latter type the strike off screed often requires heavy hydraulic controls to provide a variable angular relationship between the direction of travel of the spreader and the plane of the screed to spread the concrete. Some slip-form type pavers utilize this construction also.

The types of previously discussed spreaders have greatly diminished the labor required to move the concrete into position for finishing, but the excessive rolling and repositioning of the concrete tends to disturb the uniform dispersion of the aggregate.

This disadvantage led to the development of the full-load hopper type concrete spreader. In this type spreader the concrete is spread blanket-like in a direction transversely to that in which the spreader is moving. The full-load hopper type spreader requires a sturdy frame supported by wheels which ride on the forms. The hopper, in order to be able to spread a full width of concrete in one path, must have a capacity of 5 to 8 cubic yards. This aspect of this type spreader alone requires certain inherent, undersirable features and results. In order to accommodate this volumetric capacity the hopper must have a vertical dimension which limits its accessibility to the high bed rear or side dump trucks. A low bed truck could not deposit its load directly into the hopper. Furthermore, this capacity means a load of from 10 to 15 tons. The frame of the spreader must therefore be sufficiently massive and sturdy to carry such a load. This limits the adjustability of the spreader to operate on but a small range of form widths. Moreover, the hopper must be loaded at one side or the other of the frame, thus imparting almost the entire weight of the concrete load together with a considerable portion of the weight of the spreader itself onto one side of the form.

It is therefore an object of the present invention to provide a method and apparatus for concrete distribution whereby concrete is received from a supply source and simultaneously deposited at an area remote from the point where it was received.

It is a further object of the present invention to provide a method and apparatus for distributing, vibrating, striking off and finishing concrete between forms.

It is a further object of the present invention to provide a concrete distributor which can receive concrete from a supply source at a fixed or movable location and discharge the concrete concurrently in a selective spread pattern and in any direction independent of the receiving position.

It is a still further object of the present invention to provide a concrete distributor in which the receiving portion is vertically adjustable in order to accept the concrete from high or low bed trucks.

It is a still further object of the present invention to provide a concrete distributor which can receive concrete from consecutive supply trucks without interruption of the deposit of concrete from the discharge end.

It is a still further object of the present invention to provide a concrete distributor which can be adapted to be supported on the forms themselves, or on the sub-grade, sub-base or receiving surface as well.

It is a still further object of the present invention to provide a concrete distributor by which the concrete, as it is deposited, can be laid fully compacted and sufficiently leveled for final screeding and finishing without further movement or working of the concrete.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

In the drawings:

FIG. 1 is a top plan view of the concrete distributor according to the present invention;

FIG. 2 is a side elevation of the apparatus shown in FIG. 1;

FIGS. 3, 4 and 5 are schematic representations in top plan showing some extreme positions possible as a result of the design configuration of the present concrete distributor;

FIG. 6 is an enlarged side elevation partly broken away taken substantially on line 6—6 of FIG. 1;

FIG. 7 is a cross section taken substantially on lines 7—7 of FIG. 6;

FIG. 9 is a cross section taken substantially on line 9—9 of FIG. 1;

FIG. 10 is an enlarged detail section of a portion of FIG. 9;

FIG. 11 is an enlarged partial side elevation, partly broken away, taken substantially on line 11—11 of FIG. 1;

FIG. 16 is an enlarged partial cross section taken substantially on line 16—16 of FIG. 1; and FIG. 17 is a section taken substantially on line 17—17 of FIG. 16.

Figure 8:
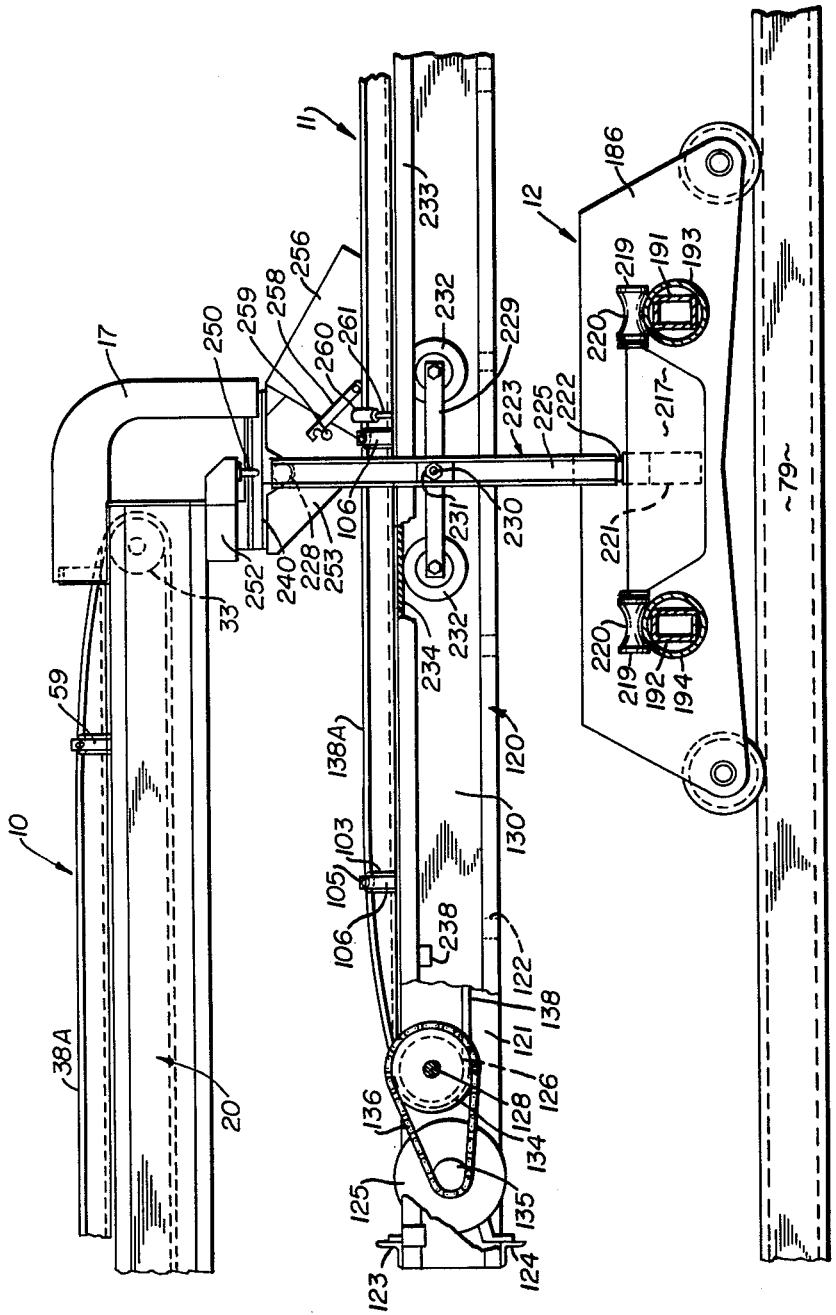
FIG. 8 is an enlarged cross section taken substantially on line 8—8 of FIG. 1.
Figure 12:
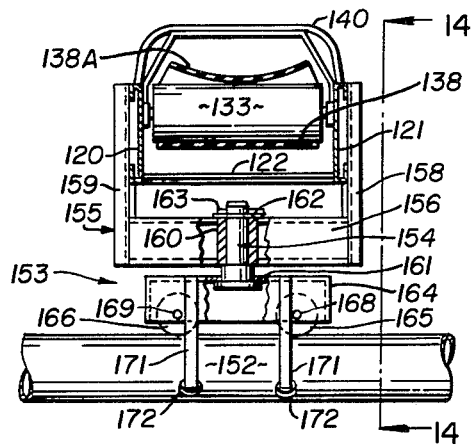
FIG. 12 is an enlarged section taken substantially on line 12—78 of FIG. 1.

In general, a concrete distributor according to the present invention and capable of performing the method thereof comprises two conveyor means—a lead and lag conveyor assembly. The discharge end of the lead conveyor assembly overlaps the lag conveyor assembly to confine all discharge thereon. These overlapping ends of the two conveyor sections are supported on a common or main carriage (movable longitudinally and transversely) in such a way as to maintain the overlapping relationship of the lead conveyor assembly with respect to the lag conveyor assembly and yet permit free articulation, both about a horizontal and vertical axis, of the two conveyor assemblies about the point of overlap as well as to permit longitudinal displacement of the entire lag conveyor assembly thereon.

The charging end of the lead conveyor assembly is carried on a lead carriage assembly and is provided with a charging hopper for directing the concrete onto the charging end of the lead conveyor belt as the concrete is discharged from the supply truck.

The discharge end of the lag conveyor assembly is supported on a follower or lag carriage assembly so that the discharge end is freely movable longitudinally and transversely.

The independently controlled movement of the lead, main and follower carriages; the articulation of the two conveyor assemblies; and, the longitudinal displacement of the lag conveyor assembly with respect to the main carriage permits innumerable combinations of movement which facilitate depositing concrete by the present device according to any desired spread pattern.

Furthermore, by providing a vibrator at the discharge end of the lag belt the concrete is fully compacted as it is deposited. Together with the available manipulation of the device, this permits distributing the concrete for a slab in condition ready for final screeding and finishing, which, therefore, may be accomplished by a screed attached to and spaced a fixed distance behind said lag conveyor assembly.

Referring to the drawings, the concrete distributor according to the present invention is comprised of several elements which can be indicated generally by the following numerical designations in the ten series as best shown in FIG. 1.

The concrete distributor comprises a lead conveyor assembly 10 and lag conveyor assembly 11, which are supported in overlapping, articulated relationship by a main carriage assembly 12. The other end of the lead conveyor assembly 10 is supported by a lead carriage assembly 13. The other end of the lag conveyor assembly 11 is supported by a follower or lag carriage assembly 14. The concrete distributor receives the concrete through a charging hopper 15, transports it along the lead conveyor assembly 10 to the articulated overlap 16 of the conveyor assemblies 10 and 11 and transfers it to the lag conveyor assembly 11 through the elbow connector 17. The concrete is then transported along the lag conveyor assembly 11 and deposited at the desired location through discharge spout 18.

*Lead conveyor assembly*

As best seen in FIGS. 1, 2, 6, 7 and 8, the lead conveyor assembly 10 is comprised of two longitudinal C-channel structural side members 20 and 21 which are connected along their base portion at spaced intervals by transverse braces 22.

Upper and lower angle irons 23 and 24 respectively, are secured transversely across the charging end of the longitudinal frame members 20 and 21 to provide additional structural rigidity to the charge end of the lead conveyor assembly 10 and to provide a base for mounting motor 25. Longitudinally inwardly of motor 25 a flat belt pulley 26 is rotatably mounted between the longitudinal side members 20 and 21, as by journaling the pulley shaft 28 in journal blocks. Journal block 29 is attached to the web 30 of side member 20 and journal block 31 is attached to the web 32 of side member 21. A second flat, idler belt pulley 33 is similarly rotatably mounted at the discharge end of the lead conveyor assembly 10.

Between the belt pulley 26 and the journal 29, a sprocket wheel 34 is nonrotatably mounted on shaft 28 in alignment with a sprocket 35 driven by a motor 25. A chain 36 transmits the driving power from the sprocket 35 to sprocket 34.

A conveyor belt 38 is reeved around drive pulley 26 and idler pulley 33.

The charging hopper 15 is detachably mounted on the top of the lead conveyor assembly 10 at the charging end. Plate side members 39 and 40 rest on the upper legs 41 and 42 of the C-channel side members 20 and 21 respectively. A series of side tabs 43 extend downwardly from the side plates 39 and 40 and engage the outer face of the upper lip portions 44 and 45 of side members 20 and 21 to prevent movement of the hopper 15 laterally of the lead conveyor assembly 10. A protective cover plate 46 extends between the side plates from the upper opening into the hopper 15 downwardly and rearwardly to engage the upper angle iron brace 23. A rear funneling plate 48 extends from the upper end of the cover plate 46 downwardly and forwardly, terminating just above the conveyor belt 38. Side funneling plates 49 and 50 extend downwardly and inwardly from side plates 39 and 40, respectively, from the upper opening of the hopper assembly 15. The fourth side of the hopper funnel is the vertical front plate 51 which may be provided with an inverted weir-like notch 52 that extends the substantial width of the belt 38 and of a depth sufficient to permit a desired volumetric discharge of concrete from the hopper on the belt.

To prevent spillage of the concrete off the side of the belt 38, the upper or carrying run 38a of belt 38 is supported medially of the drive pulley 26 and the idler pulley 33 in such a way as to give an arcuate flume-like cross section to carrying run 38a. At the hopper 15 the cross section is imparted by two angularly inclined idling support rollers 53 and 54 journaled on a substantially V-shaped shaft 55 mounted on support arms 56 and 57 depending from the under side of the side funnel plates 49 and 50, respectively. Similar idler rools are spaced as needed along the entire length of the lead conveyor assembly 10 except that the support on 59 extends upwardly from the side members 20 and 21, as shown in FIG. 2.

The preferred form of the lead carriage assembly 13 is best seen in FIGS. 6 and 7. A dolly frame 60 is provided with a vertical, round stanchion post 61, suitably braced. A series of transverse bores 62 are provided along the length of the stanchion post. A collar 63 is slidably received on stanchion post 61 and drilled to permit selective insertion of lock bolt 64 through bore 62 in stanchion post 61. Rotatably positionable over the upper portion of the stanchion post 61 is an elongated cap 65, the lower end of which abuttingly engages the collar 63. The selective positioning of collar 63 along the stanchion post 61 thus controls the vertical position of cap 65.

Secured perpendicularly across the upper end of cap 65 is a sleeve 66 which is braced, as by wing plates 68. The length of sleeve 66 is preferably equal to the width of the lead conveyor assembly 10 in order to fit between bracket 69 extending downwardly from, and affixed to, the longitudinal side member 20 and the bracket 70 extending downwardly from and affixed to the side member 21. The lower ends of brackets 69 and 70 are bored to register with the interior of the sleeve 66 to receive a bolt, or pin, 71 therethrough.

The lead carriage assembly 13 thus permits pivoting of the lead conveyor assembly 10 about two axes at that support. The lead conveyor assembly 10 may pivot about the vertical axes of stanchion post 61 and also about the horizontal axis of pin 71. In addition thereto the horizontal pivotal axis may be raised or lowered by the vertical adjustment of the cap 65 on stanchion post 61, or if it becomes necessary, the end of the lead conveyor assembly 10 carrying the hopper 15 may be lowered still further by disconnecting the charge end of the lead conveyor assembly from the lead carriage assembly 13 and resting it on ground level, though this will seldom be required because of the extreme flexibility of vertical positioning obtainable by the carriage assembly so far described.

The under side of dolly 60 is bifurcated to provide downwardly depending legs 72 and 73. Flanged wheels 74 and 75 are journaled within the bifurcated portion on axles 76 and 77 which extend between legs 72 and 73. The flanged wheels 74 and 75 are adapted to ride on a form 79, as shown. The wheels are also suitable for riding directly on a pipe rail supported by a chair assembly, as is currently the common practice for moving concrete spreading and finishing equipment along a bridge deck. As an alternative it may be desirable to utilize two rubber wheels, or casters, in lieu of the wheels 74 and 75. The casters could ride directly upon the receiving surface onto which the concrete is to be deposited.

Suitable brake means (not shown) may be supplied for the wheels 74 and 75 in order to lock the lead carriage assembly in a fixed position when receiving concrete, if desired.

To inpart lateral stability to the lead carriage assembly 13, a similar dolly 90 as shown in FIG. 1 is interconnected to dolly 60 by a transverse bracing means 91. The second dolly 90 rides on the opposite form 92.

Figure 15:
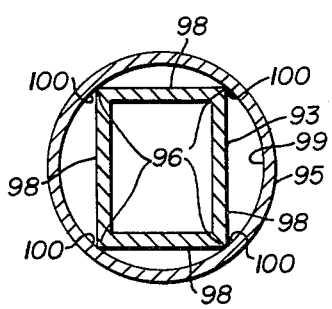
FIG. 15 is an enlarged cross section taken substantially on line 15—15 of FIG. 1.

Transverse bracing, or track, means 91 comprises a hollow square or rectilinear structural member 93 (FIG. 15) rigidly attached and braced to the dolly 60, and a similar structural member 94 rigidly attached and braced to dolly 90. These two members 93 and 94 are telescopable within a central pipe-like section 95 of such diameter that the four corners of the structural members or shafts 93 and 94 come into contact with the internal diameter of the pipe-like section 95, as shown in FIG. 15.

The length of the pipe-like section 95 is such as to permit sufficient telescoping of the square or rectilinear members 93 and 94 to accommodate a wide variety of widths, or gauges, between the rails or forms 79 and 92. The geometry of the partiular interaction of the rectangular or square members 93 and 94 with the circular section 95 has several advantages.

First, the members can be telescoped with a minimum of friction because the contact between the telescoping members is only along the corners 96 instead of the entire surface, as would be the case if concentric, identical geometric cross sections were telescoped.

Second, the flat side 98 of the square or rectangular members 93 and 94 as well as the inside surface 99 of the pipe-like section 95 can be splattered with concrete, which normally adheres tightly to metal, without having to be cleaned off in order to telescope the members 93 and 94 into center section 95.

Third, the inward telescoping action of the square or rectangular members 93 or 94 into the circular section 95 acts to itself scrape off any concrete or foreign matter which might adhere to the corners 96 of the square or rectangular members 93 and 94 or the contact surface 100 of the pipe-like section 95.

*Lag conveyor assembly*

The lag conveyor assembly 11 is of generally similar construction to the lead conveyor assembly 10. As best seen in FIGS. 1, 2, 8, 12 and 14, the assembly 11 is comprised of two longitudinal C-channel structural side members 120 and 121 which are interconnected along their base portion at spaced intervals by transverse braces 122.

Upper and lower angle irons 123 and 124, respectively, are secured transversely across the lead end of the longitudinal frame members 120 and 121 to provide additional structural rigidity to the lag conveyor assembly 11 and to provide a base for mounting motor 125. Longitudinally inwardly of the motor 125 a flat, belt pulley 126 is rotatably mounted between the longitudnal side members 120 and 121, as by journaling the pulley shaft 128 in journal blocks. Journal block 129 is attached to the web 130 of side member 120 and journal block 131 is attached to the web 132 of side member 121. A second, flat, idler belt pulley 133 is similarly rotatably mounted at the discharge end of the lag conveyor assembly 11.

Between the belt pulley 126 and the journal 129 a sprocket wheel 134 is non-rotatably mounted on shaft 128 in alignment with a sprocket 135 driven by motor 125. A chain 136 transmits the driving power from sprocket 135 to sprocket 134.

Conveyor belt 138 is reeved around the drive pulley 126 and idler pulley 133, and the upper carrying run 138a of the belt 138 is suported medially of the drive pulley 126 and the idler pulley 133 in such a way as to give an arcuate flume-like cross section to the carrying run 138a. This flume-like cross section is imparted by angularly inclined idling support rollers 103 similar to rollers 53 for example, on lead assembly 10. The rollers 103 are similarly journaled on a substantially V-shaped shaft 105 mounted on support arms 106 which extend upwardly from the side members 120 and 121.

At the discharge end of the lag conveyor assembly 11 a spout 140 is provided to assure that the concrete is directed downwardly as it leaves the conveyor 138 and also to minimize spattering of the concrete as it drops into position on the receiving surface. In opposition to the spout 140 is an inclined guiding pan 141 which extends downwardly and outwardly from the discharge end of the lag conveyor assembly and which is secured to the longitudinal side members 120 and 121 by welding or suitable means not shown. Adjustably positionable between the spout 140 and the guiding pan 141 is a vibrator 142 projecting downwardly therefrom. Vibrator 142 is positioned to vibrate the concrete as it is deposited onto the receiving surface in order to assure subsidence of the concrete.

As shown in FIG. 1, the discharge end of the lag conveyor assembly 11 is carried by the lag carriage assembly 14. The lag carrier assembly 14 also rides on the forms 79 and 92 by means of two dollies 145 and 146 each constructed on the order of dolly 90 and having similarly flanged wheels 148. A telescoping bracing or track, means 149 extends transversely between dollies 145 and 146 and comprises two square or rectilinear structural members or shafts 150 and 151 rigidly secured to dollies 145 and 146, respectively, and telescopically received in a central pipe-like section 152 similar to the construction of bracing means 91. A truck assembly, indicated generally by the numeral 153 and best shown in FIGS. 12 and 14, rides upon the central pipe-like section 152.

A pivot pin 154 extends vertically upwardly from the truck assembly 153 and engages a support bracket 155 rigidly secured to the lag conveyor assembly 11 in proximity to the discharge end thereof.

The support bracket 155 is spaced from the end of the lag conveyor assembly 11 in order to provide some overhang for the deposit of concrete beyond the lag carrier assembly 14 and also for a reason hereinafter more fully explained with regard to the longitudinal displacement of the lag conveyor assembly 11. The support bracket 155 comprises a horizontal base 156 extending between legs 158 and 159 (FIG. 12) which are rigidly attached to the longitudinal side members 120 and 121, respectively of the lag conveyor assembly 11. An annular bearing sleeve 160, disposed vertically in base 156, journals pivot pin 154 and rests upon the shoulder 161 of the pin 154 which supports the lag conveyor assembly 11 slightly above the truck assembly 153. The upper end of the pivot pin 154 extend through the base 155 and is retained therein by a locking means, such as washer 162 and cotter pin 163.

The truck assembly 153 comprises a housing 164 in which pivot pin 154 is anchored and in which two wheels 165 and 166 are journaled, as on axles 168 and 169. The periphery 170 of the wheels 165 and 166 are preferably concavely dished at the same radius as the outer surface of the center pipe-like section 152 of the bracing means 149 in order to ride thereon. Yokes 171, mounted in opposed pairs, extend downwardly from the housing 164 to engage the pipe-like center section 152 below the horizontal center line thereof by rollers 172.

Because of the unique interconnection of the lag conveyor assembly 11 through the support bracket 155, the pivot pin 154 and the truck assembly 153 with its depending yokes 171, the discharge end of the lag conveyor assembly 11 cannot separate from he dollies 145 and bracing means 146, irrespective of whether the balance of the lag conveyor assembly 11 creates a downward or upward thrust at the discharge end. Such a change in balance of the lag conveyor assembly 11 can be effected by the longitudinal displacement of assembly 11 in relation to the main carriage assembly 12.

The truck assembly 153 thus permits the discharge end of the lag conveyor assembly 11 to be freely moved transversely from side to side with the wheels 165 and 166 riding upon the outer annular surface of the pipe-like center section 152.

This transverse movement can be accomplished manually by an operator standing at the discharge end of assembly 11, or the truck assembly 153 may be mechanically moved by synchronized motor means similar to that on the main carriage hereinafter described, or by a hydraulic motor means. In any event, the operation of the discharge end is so easily accomplished manually because of the unique construction of the preferred form of the concrete distributor disclosed herein that power means at this point is unnecessary except in situations where it is desirable not to have an operator at the discharge end of the lag conveyor assembly 11.

In order to permit sufficient telescoping of the bracing means 149 for the lag carriage assembly 14 to be accommodated on a wide variety of form or rail gauges or widths, the center section will not always extend sufficiently close to the dollies 145 and 146 to permit the discharge end of the lag conveyor assembly 11 to be moved, via the truck assembly 153, close enough to deposit concrete adjacent forms. Extension sections 174 can be fitted between the ends of the center pipe-like section 152 and the dollies 145 and 146 to provide a continuation of a sufficient portion of the outer annular surface of section 152 upon which the truck assembly 153 can be operated.

Figure 13:
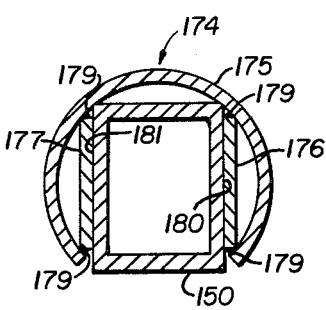
FIG. 13 is an enlarged section taken substantially on line 13—13 of FIG. 1.
Figure 14:
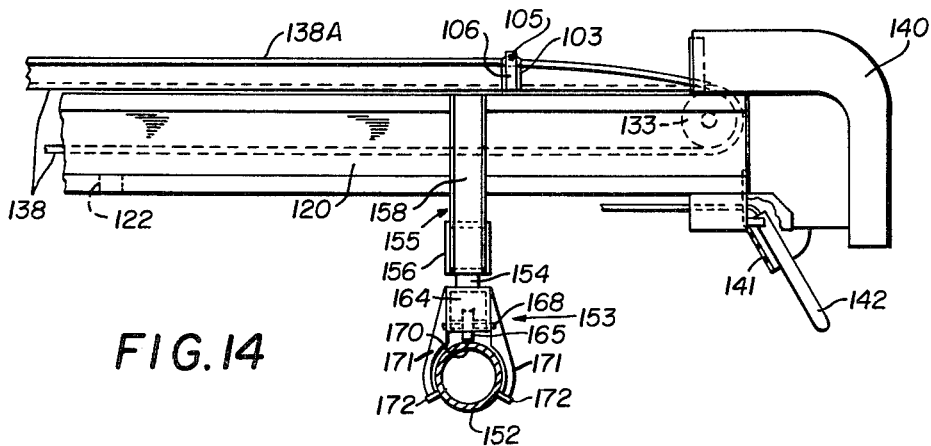
FIG. 14 is an enlarged cross section taken substantially on line 14—14 of FIGS. 1 and 2.

An extension section 174, as best seen in FIG. 13, comprises a short length of pipe-like tubing 175 comparable in outer diameter to the center pipe-like section 152. However, a longitudinal portion of the arc of the annular body of tubing 175 is removed. The segment of the arc removed can be described as that defined by a cord equal at least to the width of the square or rectilinear structural member 150 over which the extension section 174 is to be fitted. Spacing plates 176 and 177 are secured to the interior of tube 175, as by welding 179, in parallel relation, one on either side of the opening into body 175 by the segment of the arc removed. The spacing plates 176 and 177 closely engage the exterior side surfaces 180 and 181 of the square or rectilinear structural member 150, respectively.

*Main carriage assembly*

The main carriage assembly 12 also rides on the rails, or forms, 79 and 92 by two wheeled carrying dollies 185 and 186. The two dollies are interconnected by two telescopable extension or bracing, or track means 187 and 188 identical with the bracing means 91 on the lead carriage assembly 13 and the bracing means 149 on the lag carriage assembly 14. That is, two structural members or shafts 189 and 190 having square or rectilinear cross sections are rigidly attached to dolly 185 and two square or rectilinear structural members or shafts 191 and 192 are rigidly attached to dolly 186. The rectilinear members 189 and 191 are telescoped within a pipe-like center section 193 and rectilinear members 190 and 192 are telescoped within a pipe-like center section 194.

Each of the dollies 185 and 186 are identical so only dolly 185 as best seen in FIG. 11 will be described in detail. Flanged wheels 195 and 196 mounted between the dolly side plates on axles 198 and 199, respectively, one at each end of the dolly, engage the form 92. Each of the axles 198 and 199 extend outwardly beyond the face of dolly 185. A sprocket 200 is nonrotatably secured to the outer portion of axle 198 and a similar sprocket 201 is nonrotatably secured to the outer portion of axle 199. A drive chain 202 operably connects the sprocket 200 to a drive sprocket 203 and a drive chain 204 operably connects the sprocket 201 to a drive sprocket 205. Each of the chains 202 and 204 also engage idler sprockets 206 displaced from an imaginary line between the drive sprockets 203 and 205 and their respective driven sprockets 200 and 201 in order to prevent flapping of the chain.

The drive sprockets 203 and 205 are nonrotatably mounted on a common shaft 208. Shaft 208 extends outwardly of dolly 185 from a gear reducer 209 driven by motor 210, both the gear reducer 209 and the motor 210 being mounted on the dolly 185.

If desired, the dollies 145 and 146 on the lag carriage assembly 14 and/or the dollies 60 and 90 on the lead carriage assembly 13 can be similarly constructed for powered operation.

A table 211 is secured across the top of the rectilinear structural members 189 and 190 adjacent to dolly 185. A generator 212 and a gasoline engine 213 which are operably connected by a belt drive means 214 are both mounted on the table 211. Electric power from this generator 213 drives all the other motors on the concrete distributor in a manner hereinafter more fully described.

Between the table 211 and the dolly 186 the main carriage truck assembly 215, best depicted in FIGS. 9, 16 and 17, rides on the bracing means 187 and 188. The main carriage truck assembly 215 comprises two heavy duty axles 216 and 217 oriented transversely of the bracing means 187 and 188. A spool roller or wheel 219 is journaled on each end of the axles 216 and 217 and each wheel has a concave peripheral surface 220 adapted to mate with the annular outer surface of the pipe-like center sections 193 and 194 of the bracing means 187 and 188, respectively. A deep-beamed frame member 221 is secured between the medial portion of the axles and carries a vertically upstanding conical trunnion pin 222. The conical trunnion pin 222, by its shape, is especially adapted to receive the downward thrust of a box gudgeon assembly 223 pivotally mounted thereon. The rectangular frame of the gudgeon assembly 223 comprises a base 224, in which is carried the bearing 227 for pivotally engaging the trunnion pin 222, two vertical side members 225 and 226 rigidly connected thereto and a top member 228 rotatable in and extending between side members 225 and 226.

As best shown in FIG. 8, a whiffletree beam 229 is rockably mounted inwardly of the box gudgeon assembly 223 on the vertical side member 225, as by a pin 230 which extends outwardly through the side members 225 and is secured in place by a nut 231. A wheel 232 is rotatably mounted at each end of the whiffletree beam 229 and is adapted to engage the lag conveyor assembly 11 by interfitting into a trackway between the web 130 and the lip portion 233 of the C-channel side member 120 to ride on the leg 234 thereof. An identical whiffletree beam 235 is rockably mounted on side member 226 with wheels 236 adapted to engage the longitudinal side member 121 of the lag conveyor assembly 11 in a similar manner as those on the whiffletree beam 229 heretofore described.

The lag conveyor assembly 11 can thus be displaced longitudinally of itself through the box gudgeon assembly 223 with inward displacement of the assembly 11 limited only by contact of the side members 225 and 226 of the box gudgeon with the legs 158 and 159 of the support bracket 155 on the discharge end of the lag conveyor assembly 11. While these legs 158 and 159 were described as being in proximity to the discharge end of the lag conveyor assembly 11 they are sufficiently displaced inwardly therefrom to prevent the wheels 232 and 236 from disengaging the ends of the longitudinal side members 120 and 121, respectively. Disengagement resulting from outward extension of the lag conveyor assembly 11 is prevented, for example, by a stop 238, as shown in FIG. 8, affixed to the web 130 of the longitudinal side member 120, which blocks the wheel 232.

The discharge end of the lead conveyor assembly 10 is permanently carried by the gudgeon assemgly 223. The top member 228 of the gudgeon assembly 223 is preferably cylindrical in order to provide the least resistance to and accumulate the smallest amount of concrete passing from the lead conveyor assembly to the lag conveyor assembly. An annular collar 240 is secured transversely on rotatable top member 228. Two transversely spaced saddle notches 241 are preferably cut in the collar 240 in order to seat the collar on to the top member 228 in order that they can be fastened together with more facility, as by welding 242. An annular flanged band 243 is in turn secured, as by welding 244, to the inner surface of the collar 240 with the flange 245 extending radially outwardly from the band 243 and sufficiently above the collar 240 to provide a circular raceway 246 in which a slip ring 248 can be slidably received.

Opposed pedestal brackets 249 and 250 are fixed to slip ring 248 and extend upwardly for engagement with wings 251 and 252 mounted on the longitudinal side members 20 and 21 of the lead conveyor assembly 10, respectively. By suitably attaching the pedestal bracket 249 to wing 251 and pedestal bracket 250 to wing 252, the discharge end of the lead conveyor assembly 10 is rotatably attached to and supported by the gudgeon assembly 223. The slidable action of slip ring 248 and its raceway 246 allows for the articulation between the lead and lag conveyor assemblies 10 and 11 about a vertical axis at 16, as shown particularly in FIGS. 1 and 3–5.

A trough 253 may be demountably secured to the top member 228 which trough extends downwardly and outwardly of the discharge end of the lead conveyor assembly 10, terminating in close proximity to the carrying run 138a of the belt 138 on the lag conveyor assembly 11. For demounting ease the trough 253 is preferably attached to two legs 254, depending from upper members 228, by ring pins 255.

The elbow 17 is a splash guard that extends from above the lead conveyor assembly 10 down to approximately the collar 240. The snout-like splash guard 256 therebelow is mounted on to the trough 253 by latch bars 258 and engaging pins 259 (FIG. 8).

In order to assure that the concrete is transferred to approximately the center of the belt 138, a guide roller 260, as seen in FIG. 9, is placed on each side of the carrying run 138a to engage the edges of the belt 138 and prevent lateral run out. It has been found that several pair of guide rollers 260 placed medially of the lag conveyor assembly, for example, as shown journaled on shaft 261 extending upwardly from the longitudinal side member 120 will suffice to prevent lateral run out of the belt 138.

*Main carriage power means*

The main carriage truck assembly 215 is powered for transverse movement along the bracing means 187 and 188 by a motor 265 which is shown mounted on dolly 186. The motor 265 operates through a gear reducer 266 to selectively turn a drum 268 around which is wound a cable 269.

One end of cable 269 is connected to one side of the truck assembly 215, as to the axle 216, is wound around the drum 268 mounted in proximity to one side of the main carriage assembly 12, and then passes beneath the assembly 215, as through sleeve 270, to a sheave 271 on the other side of the main carriage assembly 12, as at table 211. The cable is reeved through sheave 271 and then attaches to the main carriage truck assembly 215 as at axle 217.

Reversing switches 272 and 273 are utilized to prevent the main carriage truck assembly 215 from jamming into either the sheave 271 or the drum 268. Switch 272 is mounted along the travel path of cable 269 adjacent the sheave 271 and switch 273 is similarly mounted along the travel path of cable 269 adjacent the drum 268. A switch trip 274 is affixed to the cable 269 in proximity to the axle 217 and a switch trip 275 is similarly affixed to cable 269 in proximity to the axle 216. Thus, as the motor moves the main carriage truck assembly 215 transversely along the bracing means 187 and 188 toward the drum 268, the switch trip 275 contacts the reversing switch 273 and the transverse movement of the truck assembly 215 is reversed. A similar reversal is affected when the switch trip 274 contacts the reversing switch 272.

A similar power means could be provided to move truck 153 transversely along bracing means 149 of the lag carriage assembly 14, or a motor, not shown, could be mounted within the truck 153 itself to power a friction wheel engaging the center section 152 of bracing means 149 and accomplish the same purpose.

*Operations*

The structure heretofore described provides for the improved distribution of concrete under even the most adverse circumstances.

If the pouring situation is such that it is desirable, all the dollies may be equipped with the steel flanged wheels described in conjunction with the preferred embodiment. However, it must be remembered that situations may arise in which it is desirable to use wheels adapted for riding directly on the sub-base or receiving surface. In some situations such wheels may be necessary only on the lag, the lead, or both the lag and lead carriage assemblies. Such wheels may even be desired on the main carriage assembly.

In any event, the manipulation of the carriage assemblies 12, 13 and 14 with respect to each other; the articulation of the lead and lag conveyors 10 and 11 about 16; the longitudinal displacement of the lag conveyor assembly 11 relative to the discharge end of the lead conveyor assembly 10; and, the transverse movement of the articulation point 16 relative to the main carriage assembly 12, as well as the transverse movement of the discharge end of the lag conveyor assembly 11 with respect to the lag carriage assembly 14—examples of which are shown in FIGS. 3–5—provides innumerable distribution patterns available with the structure herein disclosed.

In additions to the manipulations heretofore described, the discharge end of the lag conveyor assembly 11 can be disconnected from the lag carriage assembly 14 by removing the cotter pin 163 and lifting that end of the conveyor assembly 11 off the truck 153. The discharge end of the lag conveyor assembly 11 can then be swung in an arc greater than its normal 180° range so that discharge can even be effected on the opposite side of the main carriage assembly 12. This would be especially desirable in confined areas. Moreover, the discharge can be above or below the normal discharge level, as it makes no difference how the belts are inclined with respect to each other.

In the embodiment described, motors 25 and 125 are utilized to operate the conveyor belts 38 and 138. Motors 210 are utilized to power the main carriage dollies 185 and 186, and, if desired, similar motors could be used to power the lead and lag carriage dollies as well. A motor 265 is utilized to accomplish movement of the main carriage truck assembly 215 transversely along the bracing means 187 and 188. A similar motor powered arrangement could also be adapted to the lag truck assembly 153. By supplying all these motors with current from a common source, generator 212, which is driven by the engine 213, and by using all three phase induction motors, their speed can be regulated solely by the throttle of the engine turning the generator—thus controlling their speed by the current supplied to them. By various switch arrangement the motors can be selectively turned on and off. Furthermore, by using three phase induction motors, their direction of rotation can be reversed simply by interchanging the connections of any two motor leads, which by a simple switch arrangement, not shown, can permit an operator to completely control the machine from a remote location. In fact, all the control relays can be mounted on the main carriage so that the control panel may be mounted at any location on the distributor or carried by the operator.

Supplying the concrete distributor with the various power means described provides an apparatus which can automatically lay the concrete in a preselected pattern. For example, the use of power means on truck assembly 153 and on the lag carriage dollies 145 and 146 could be set to operate as follows. The truck assembly 153 could be powered to reciprocate transversely along bracing means 149 and as the assembly 153 reaches the limit of its transverse movement it would actuate a switch that would cause the power means on the lag dollies 145 and 146 to move forward a given number of inches in order that the transverse movement of the lag conveyor assembly 11 would automatically lay contiguous rows of concrete.

One additional modification worthy of consideration for certain applications of the present apparatus would be to operate the lag truck assembly 153 by a hydraulic motor. The engine 213 can operate a hydraulic pump as well as generator 212 and the flow from the pump to the hydraulic motor could be regulated by the operator to provide a continuous movement of the trucks 153 at a speed selectively independent of that of the induction motors on the concrete distributor. This effect could also be accomplished by using a rheostat in series with the motor to operate the truck assembly 153.

The depositing of concrete can be maintained in a continuous, uninterrupted flow by directing the discharge chutes from two different trucks into the hopper 15. However, only one of the trucks discharges its load. As soon as the one truck is empty, the second truck immediately begins to discharge its load. While the second truck is discharging, the first truck moves out to allow a third truck to take its place preparatory to discharging its load immediately after the second truck is empty.

Because of the full compaction and uniform distribution obtainable by a concrete distributor made in accordance with the concept of the present invention, a finishing screed, indicated generally by the numeral 215, may be spaced at a given interval behind the lag carriage assembly 14 and be movable therewith. The screed board 216 is carried between dolly frames 218 and 219 which are provided with flared wheels 220 and constructed in a manner similar to the lead dollies 60 and 90. The screed board 216 is preferably carried by dollies 218 and 219 in such a manner as to be vertically adjustable and is provided with one or more vibrators 221. A rigid link bar 222 connects screed dolly 218 and dolly 145 of the lag carriage assembly and a similar link bar 223 connects the screed dolly 219 to dolly 146 of the lag carriage assembly. The finished screed is thereby maintained a fixed distance behind the discharge end of the lag conveyor assembly. The apparatus disclosed herein thus is capable of receiving concrete from a supply source at a supply locus, either movable or stationary, transporting it to a remote deposit locus from which it is discharged in a preselected pattern by controlled movement of the discharge locus, vibrating the concrete as it is deposited and screeding it to a finished texture.

It is thus apparent that a concrete distributor constructed in accordance with the concept herein disclosed accomplishes the objects of the invention.

What is claimed is:

1. A concrete distributor comprising, a lead and lag conveyor assembly each capable of transporting concrete therealong and each having a discharge end, said lead conveyor assembly adapted to receive concrete from a supply source, said lag conveyor assembly adapted to discharge concrete onto a receiving surface, a main carriage assembly, said main carriage assembly having longitudinally movable lateral track means and a truck means laterally movable on said track means, said truck means supporting the discharge end of said lead conveyor assembly at all times in overlapping relationship with said lag conveyor assembly, a gudgeon means rotatably interconnecting said lead and lag conveyor assemblies for articulation, and means on said main carriage to permit said lag conveyor to be displaced longitudinally of itself with respect to said main carriage.

2. A concrete distributor comprising, a lead and lag conveyor assembly each capable of transporting concrete therealong and each having a discharge end, said lead conveyor assembly adapted to receive concrete from a supply source, said lag conveyor assembly adapted to discharge concrete onto a receiving surface, a main carriage assembly, said main carriage assembly having longitudinally movable lateral track means and a truck means laterally movable on said track means, said truck means supporting the discharge end of said lead conveyor assembly at all times in overlapping relationship with said lag conveyor assembly, a gudgeon means rotatably interconnecting said lead and lag conveyor assemblies for articulation, means on said main carriage to permit said lag conveyor to be displaced longitudinally of itself with respect to said main carriage and means at the discharge end of the lag conveyor to vibrate the concrete as it is discharge onto the receiving surface.

3. A concrete distributor comprising, a lead and lag conveyor assembly adapted to transport concrete therealong, said lead conveyor assembly adapted to receive concrete from a supply source, said lag conveyor assembly adapted to discharge concrete therefrom onto a receiving surface, a main carriage assembly having wheel supported dollies interconnected by laterally adjustable track means, a gudgeon assembly pivotally supported by and movable along said track means, said lag conveyor assembly being longitudinally slidable and vertically pivotal in said gudgeon and horizontally rotatable therewith, the discharge end of said lead conveyor assembly being horizontally rotatably and vertically pivotally connected to said gudgeon, a lag carriage assembly having wheel supported dollies interconnected by similarly laterally adjustable track means, said track means having an annular center section, a lag truck assembly with wheels adapted to rollingly engage said center section, at least one opposed pair of yokes extending downwardly from said lag truck assembly and embracing said center section below the horizontal center portion thereof to prevent said lag truck assembly from lifting off said center section, bracket support means connecting said lag truck assembly to said lag conveyor assembly in proximity to the discharge end of said lag conveyor assembly.

4. A method for distributing concrete on a base comprising the steps of, supporting and confining concrete received from a supply source at a receiving locus, regulating the flow of concrete from said receiving locus, transporting said concrete in a continuous flow from the receiving locus to a remote depositing locus, moving the depositing locus in any selected pattern of combined longitudinal and transverse movements over the base independently of the location and movement of the receiving locus to distribute the concrete.

5. A method for distributing concrete on a base comprising the steps of, supporting and confining concrete received from a supply source at a receiving locus, transporting said concrete in a continuous flow from said receiving locus to a remote depositing locus, moving the depositing locus in any selected pattern of combined longitudinal and transverse movements over the base independently of the location and movement of the receiving locus to distribute the concrete, simultaneously vibrating the concrete at the depositing locus as it is deposited.

6. A concrete distributor comprising, a lead and lag conveyor assembly each capable of transporting concrete therealong and each having a discharge end, said lead conveyor assembly adapted to receive concrete from a supply source, said lag conveyor assembly adapted to discharge concrete onto a receiving surface, a main carriage assembly, said main carriage assembly having longitudinally movable lateral track means and truck means laterally movable on said track means, said main carriage assembly supporting the discharge end of said lead conveyor assembly at all times in overlapping relationship with said lag conveyor assembly, a gudgeon means rotatably interconnecting said lead and lag conveyor assemblies for articulation, a lag carriage assembly having longitudinally movable second lateral track means and second truck means laterally movable on said second lateral track means, said second truck means supporting the discharge end of said lag conveyor assembly, and means on said main carriage to permit said lag conveyor to be displaced longitudinally of itself with respect to said main carriage and be pivotal thereabout.

7. A concrete distributor, as set forth in claim 6, in which the laterally extending track means supporting the main and lag carriage assemblies individually comprise opposed, laterally spaced dollies, rectilinear structural members secured to and extending outwardly from each dolly toward the opposed, laterally spaced dolly, the outer ends of said rectilinear members inserted within an annular center section with the corners of the rectilinear members engaging the inner surface of the annular center section to provide a track means between said dollies.

8. A concrete distributor according to claim 6 having extension means engagingly fitted over the rectilinear members between said center section and a dolly to provide a continuation of the annular surface of said center section, said extension means comprising, a length of a pipe-like member, a longitudinal opening the length thereof, said opening fitted over the top of the rectilinear member, spaced plates interiorly of said pipe-like member on either side of said longitudinal opening engaging the sides of said rectilinear member.

9. A concrete distributor, as set forth in claim 6, in which at least one of the laterally movable truck means is selectively movable by an induction motor powered by an electrical source of controlled output.

10. A concrete distributor, as set forth in claim 6, having a screed means spaced apart a fixed distance from and movable with said lag carriage assembly to strike off and finish the surface of the deposited concrete.

11. A method for distributing concrete on a base comprising the steps of, supporting and confining concrete received from a supply source at a receiving locus, regulating the flow of concrete from said receiving locus, transporting said concrete in a continuous flow from the receiving locus to a remote depositing locus, moving the depositing locus in any selected pattern of combined longitudinal and transverse movements over the base independently of the location and movement of the receiving locus to distribute the concrete, and simultaneously vibrating the concrete at the depositing locus as it is deposited.

12. A method for distributing concrete on a base comprising the steps of, supporting and confining concrete received from a supply source at a receiving locus, regulating the flow of concrete from said receiving locus, transporting said concrete in a continuous flow from the receiving locus to a remote depositing locus, moving the depositing locus in any selected pattern of combined longitudinal and transverse movements over the base independently of the location and movement of the receiving locus to distribute the concrete, simultaneously vibrating the concrete at the depositing locus as it is deposited and sequentially thereafter vibratingly striking off the surface of the poured concrete.

13. A concrete distributor comprising, a lead and lag conveyor assembly each capable of transporting concrete therealong and each having a discharge end, said lead conveyor assembly adapted to receive concrete from a supply source, said lag conveyor assembly adapted to discharge concrete onto a receiving surface, a main carriage assembly, said main carriage assembly having lateral track means and a truck means laterally movable on said track means, said truck means supporting the discharge end of said lead conveyor assembly at all times in overlapping relationship with said lag conveyor assembly, a gudgeon means rotatably interconnecting said lead and lag conveyor assemblies for articulation, a lead carriage assembly, said lead carriage assembly having longitudinally movable lateral track means, a stanchion post extending vertically upwardly from and movable selectively along said lateral track means, said stanchion post pivotally supporting the end of said lead conveyor adapted to receive concrete.

References Cited by the Examiner
UNITED STATES PATENTS

| | | | |
|---|---|---|---|
| 806,804 | 12/1905 | Hamilton | 198—88 |
| 1,272,564 | 7/1918 | Stuart | 198—88 |
| 1,311,298 | 7/1919 | Stuart | 198—88 |
| 2,649,185 | 8/1953 | Lichtenberg | 94—46 X |
| 2,757,782 | 8/1956 | Davis | 198—88 |
| 2,805,759 | 9/1957 | Manceau | 198—90 |
| 2,946,468 | 7/1960 | Hagen | 214—18 |
| 2,960,208 | 11/1960 | Sibley | 94—46 |
| 3,006,454 | 10/1961 | Penn | 198—89 |
| 3,107,592 | 10/1963 | Mengel | 94—46 |
| 3,177,784 | 4/1965 | Retzlaff | 94—39 |

JACOB L. NACKENOFF, *Primary Examiner.*

CHARLES E. O'CONNELL, *Examiner.*

N. C. BYERS, *Assistant Examiner.*